July 5, 1932.   G. P. LAMBERT   1,865,927
MEASURING DEVICE FOR WORKHOLDERS
Original Filed May 25, 1923   7 Sheets-Sheet 1

Inventor:
G. P. Lambert

July 5, 1932. G. P. LAMBERT 1,865,927
MEASURING DEVICE FOR WORKHOLDERS
Original Filed May 25, 1923 7 Sheets-Sheet 2

July 5, 1932.  G. P. LAMBERT  1,865,927
MEASURING DEVICE FOR WORKHOLDERS
Original Filed May 25, 1923   7 Sheets-Sheet 4

July 5, 1932.  G. P. LAMBERT  1,865,927
MEASURING DEVICE FOR WORKHOLDERS
Original Filed May 25, 1923   7 Sheets-Sheet 7

UNITED STATES PATENT OFFICE

GUSTAF PAUL LAMBERT, OF STOCKHOLM, SWEDEN

MEASURING DEVICE FOR WORKHOLDERS

Application filed May 25, 1923, Serial No. 641,486, and in Sweden August 31, 1922. Renewed April 3, 1930.

The invention relates to boring and milling machines having a vertical tool holding spindle and a table movable transversely of the spindle. The object of the invention is to provide means for accurately positioning the work piece in relation to the tool holding spindle and chiefly for locating of holes in jig plates. Heretofore the positioning of the work piece has usually been effected by displacing the work table by means of the longitudinal feed of the table on the saddle and the transverse feed of the saddle on the knee and measuring the amount of the displacement of the table in relation to the saddle and the displacement of the saddle in relation to the knee. In such an arrangement, however, the accuracy of the measuring operation is largely dependent on the exactness of the construction of the sliding parts. It is necessary that the movements of the slides are exactly rectilinear and that the slides are moved exactly at right angles to each other and these conditions must be invariably maintained. Although it is possible to make the slides originally quite rectilinear and to obtain movements exactly at right angles to each other, that is, however, a very difficult task, yet, there is no certainty that these conditions will be preserved as the movements of the slides may be affected and altered by irregular wear, collection of dust and chips or by an uneven tightening of the gibs and by clamping of the slides. The adjustments of the work piece will thus, evidently, be uncertain particularly as the accuracy of the adjustments of the work piece is dependent on the accuracy of both slides.

The above mentioned inconveniences are eliminated in accordance with the present invention by making the measurements directly between measuring abutments in fixed relation to the tool holding spindle and measuring abutments on the table in fixed relation to the work piece, the desired distances being laid off from the abutments last mentioned similarly as in an ordinary co-ordinate system. It is obvious that faults of the kind referred to are thereby entirely eliminated and any inaccuracy of the slides will have no influence whatever on the measuring results. The measurements can therefore be made as exact as possible in regard to the accuracy of the measures.

Referring to the accompanying drawings

Figure 1:
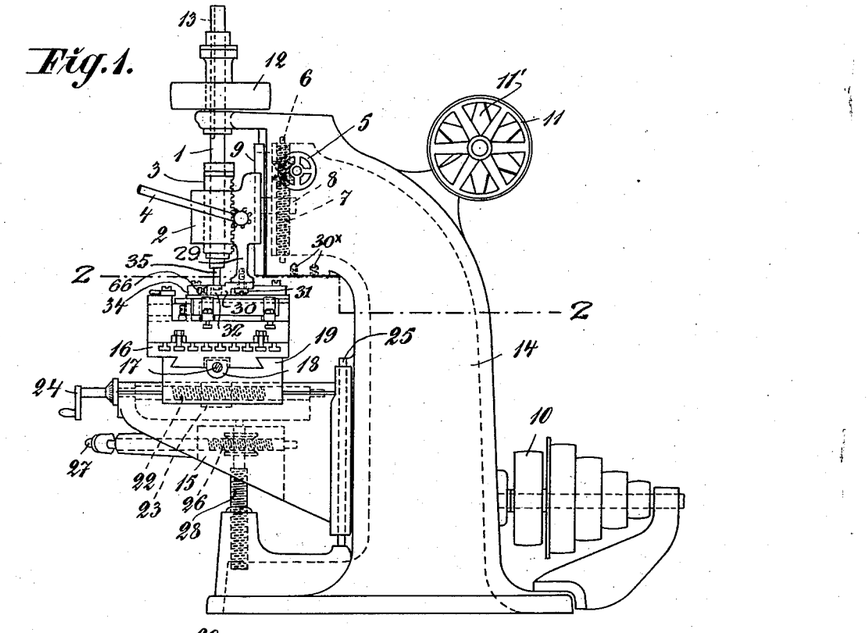
Fig. 1 is a side elevation of a milling machine.
Figure 2:
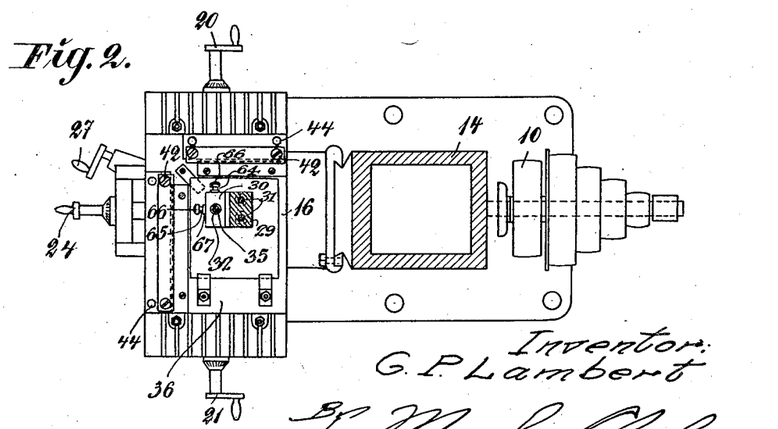
Fig. 2 is a cross sectional view on line 2—2 in Fig. 1.

The milling machine shown in Figs. 1 and 2 is provided with a vertical tool holding spindle 1 rotatable about a fixed axis and mounted in a bearing head 2 by means of a sliding socket 3 in which the spindle is rotatable but not slidable, and which may be displaced vertically in the head 2 by means of a hand lever 4 and a rack and pinion gear for the purpose of feeding the tool against the work piece. The bearing head 2 may be adjusted vertically by means of a hand wheel 5 through the medium of a worm on the shaft of the hand wheel and a worm wheel 6 on a screw 7 which is journalled vertically in the frame of the machine and provided with a nut 8 secured to the bearing head 2 which is movable in a guide way 9. The spindle 1 is driven in the usual way through a belt carried over a driving pulley 10, two guide pulleys 11, 11' loosely mounted on the same shaft and a pulley 12, which is provided with a key 13 running in a groove in the spindle 1. The pulley 12 will thus always transmit rotary motion to the spindle without partaking in the vertical movement of the spindle. The column 14 of the machine has a knee 15 carrying a saddle with a table of the usual type. The table 16 may be moved horizontally and longitudinally by means of a screw 17 journalled at both ends in the table and provided with a nut 18 secured to the saddle 19. Said screw is provided at each end with a crank handle 20 and 21 respectively. The saddle 19 may be moved in a direction perpendicular to the direction of movement of the table 16 in relation to the saddle by means of a screw 22 journalled at its ends in the knee 15 and provided with a nut 23 secured to the saddle 19. Said screw 22 may be rotated by means of a crank handle 24. The knee 15 is slidably mounted in a vertical guide way 25 and may be raised and lowered by means of a screw 26 provided with a crank handle 27 and coupled by means of a worm gear to a vertical screw 28 carrying the knee 15 and screwed into the base of the machine.

The bearing head 2 is provided with a downward extension 29 carrying a bracket 30 which is secured to the lower horizontal surface of the said extension by means of screws 31. Said bracket is provided at its outer end with a bore-hole 32 co-axial with the axis of the spindle 1, and two measuring abutments in the form of studs 64, 65 serving as fixed measuring abutments, for positioning the work piece in relation to the spindle 1. For this purpose the said studs are provided with a minutely worked measuring surface 66, having a spherical form or the form of a surface of rotation, the axes of the two surfaces lying in the same horizontal plane and perpendicularly to each other so as to cross the axis of the bore-hole 32 or the spindle respectively. The said measuring surfaces form the outer surfaces of the hexagon head of a screw screwed into the bracket 30. Provided between the screw head and the bracket is a washer 67. By using washers of different thicknesses the distances of the measuring surfaces from the axis of the spindle may be varied. The hole 32 is wide enough to allow the tool 35 to be passed therethrough without engaging the walls of the hole. In some cases, particularly in boring or drilling operations, it may be required to guide the tool and to this end a guide sleeve may be inserted in the hole 32. In order to allow of a horizontal adjustment of the bracket 30 for accurately positioning the studs 64, 65, relatively to the spindle 1, the holes in the bracket through which the screws 31 are inserted are preferably wider than the screws.

Figures 3, 4, 5:
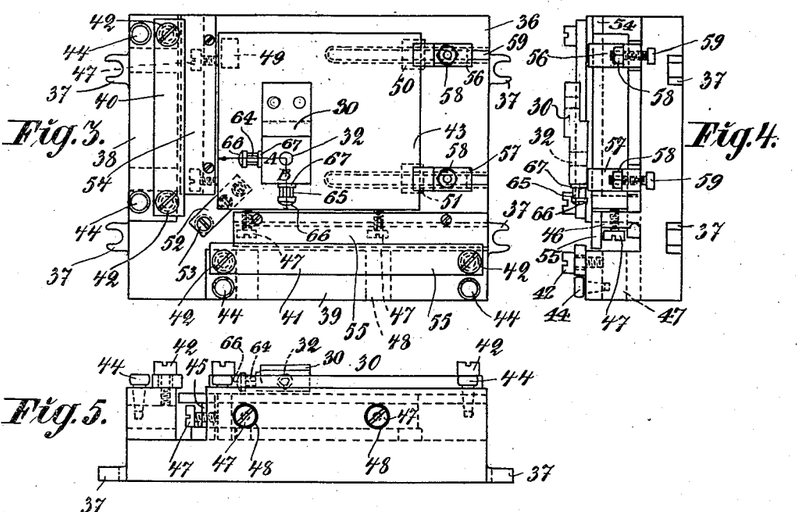
Figs. 3, 4 and 5 are a plan view, an end view and a side view respectively of the work piece holder.

Mounted on table 16 is a work piece support or holder 36, Figs. 3, 4 and 5, consisting of a rectangular plate provided with lugs 37 for securing the holder to the table. Said plate is further provided with two ribs or shoulders 38, 39 along two sides thereof. On the upper side of said ribs there are provided rulers 40, 41, which may be rigidly secured in place by means of screws 42 screwed into the ribs and passing through holes in the rulers, which are wider than the diameter of the screws so as to allow the rulers to be adjusted on the ribs to a certain extent. Said rulers are adapted to be used as base lines for accurately locating the work piece 43 in relation to the spindle 1 while using the rulers as a coordinate system and measuring the distances between the rulers and the measuring surfaces 66 of the fixed measuring abutments 64, 65 on the bracket 30. For that purpose the rulers may be adjusted so as to be placed exactly at a right angle to each other or, if required in particular cases, they may be adjusted to form another angle. In order to be able to adjust the rulers quickly in the position wanted there are provided on each rib two fixed measuring abutments 44 each forming a stud consisting of a conical steel plug inserted in a conical hole in the rib to keep it firmly in position and provided with a head having a measuring surface in the form of a surface of rotation with a vertical axis. The adjustment of the rulers in relation to these abutments may be effected by means of end measures in the form of spacing or gage blocks which are placed between the measuring surfaces of said abutments and the rear edge of the rulers as the said measuring abutments 44 are fixed on the holder the rulers may evidently be adjusted in any position relatively to each other by setting the rulers relatively to the said measuring abutments 44. Preferably, the rear and front edges of the rulers are accurately parallel with each other. In front of each rib 38 and 39 and parallelly therewith there is provided a holding rib or lug 45 and 46 respectively serving as a support for set screws 47 by means of which the work piece 43 may be positioned on and secured to the plate 36. Said ribs 45, 46 are preferably relatively thin and weak so as to relieve the plate 36 from bending forces that may be caused by the screws 47 and whereby the position of the rulers might otherwise be altered. In order to make the screws 47 easily accessible there are provided horizontal holes 48 in the ribs 38 and 39 opposite to the screws 47. The two rulers 40, 41 may, evidently, be made integral so as to form a square.

The rectangular work piece 43 is mounted on the holder plate 36 with two sides parallel with the rulers 40 and 41 and is preferably placed upon four interposed spacing plates 49, 50, 51, 52, the latter of which is screwed to the lower side of the work piece and secured to the plate 36 by means of a screw 53, passed through a hole in the plate 52, which is wider than the screw so as to allow the work piece to be slightly adjusted. The thickness of the plates 49 to 52 is chosen so that the upper surface of the work piece will be in flush with the upper surface of shelves 54, 55 screwed to the ribs 45, 46 and serving as supports for the measures. The distance between the rulers 40 and 41 and the inner surface of said shelves 54, 55 and ribs 45, 46 is preferably less than the radial distance of the measuring surfaces 66 from the axis of the spindle so as to allow the work piece to be placed with its sides at a distance from the rulers equal to said radial distance, whereby the measuring operations are simplified. After the work piece has been adjusted by means of the screws 47, it is secured in place by means of clamping straps 56, 57 and bolts 58 engaging grooves 59 in the plate 36. The rulers are preferably so arranged that the workman when standing in front of the machine has one ruler to the left and the other in front of the work piece, which arrangement will facilitate the measuring operations as the distances may then be laid off exactly in accordance with the working drawing in which the measures are counted from the left hand and the lower edges.

Before making the measurements the work piece holder 36 is rigidly secured to the table 16 and the rulers 40 and 41 are adjusted at right angles to each other, one of the rulers 41 being preferably positioned parallel with one direction of movement of the table 16. The work piece 43 is then positioned by means of the screws 47 so that its sides are parallel with the rulers and at a distance from the edge of the rulers equal to the radial distance of the fixed measuring surfaces 66 from the axis of the spindle, the work piece being then secured in place by means of the clamping devices 56, 57, 58 and the plate 52 which is screwed to the work piece holder by means of the screw 53. The desired distances may now be conveniently laid off from the rulers by means of end measures in the form of spacing or gage blocks which are placed on the shelves 54, 55 and the work piece. Supposing a hole is to be milled at the center distance A from the left hand side of the work piece and the distance B from the fore side of the work piece, sets of gage blocks having a total length of A and B respectively are placed in contact with the rulers 40 and 41 respectively and the table 16 is then moved first by means of the crank handle 20 or 21 and then by means of the crank handle 24 so as to bring the end measures in contact with the measuring surfaces of the studs 64 and 65 respectively, whereby the work piece is brought in the position wanted relatively to the axis of the spindle 1. It should be observed that in moving the table great care is to be taken that the end measures are not pressed against the measuring abutments with too great a power as it is well known that the exactness of the measurements, when using end measures, is largely dependent on the pressure by which the end measures are pressed together. Too great a pressure on the measures might also cause displacements of the rulers and the bracket. A particular method and device for limiting the pressure on the end measures suitable to be used in connection with this invention will be described below with reference to the Figures 21-24.

It will be evident from the above that this method of accurately locating the work piece in relation to the spindle of the machine is quite independent of inaccuracies in the movements of the table 16, and the saddle 19. Thus, in case the movements of said parts are not exactly rectilinear or exactly at right angle to each other, this will have no influence, owing to the fact that the measurements are taken from rulers which are rigidly connected with the work piece, to fixed measuring abutments on the machine.

In case it is to be feared that the rulers have been displaced unintentionally during the operation, it is always possible to ascertain this and to re-adjust the rulers by measuring the distance between the fixed abutments 44 and the rear edge of the rulers 40, 41 by means of gage blocks or other measuring devices, such as the wedge gauge described below with reference to Figs. 21-24.

Figure 6:
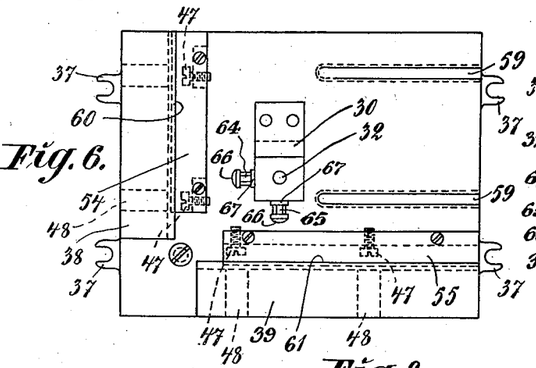
Figs. 6, 7 and 8 are similar views of another construction of the work piece holder.
Figure 7:
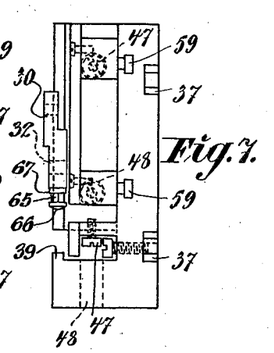
Figure 8:
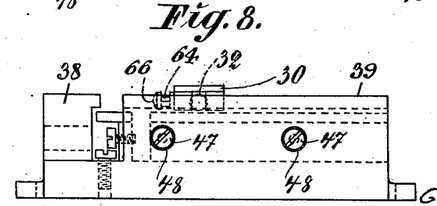

The work piece holder shown in Figs. 6, 7 and 8 differs from that shown in Figs. 3, 4 and 5 only by the particular rulers and the fixed abutments on the ribs 38, 39 being omitted. In this case the fixed ribs 38, 39 are used as rulers and for this purpose they are provided with worked measuring surfaces 60, 61 respectively disposed at right angle to each other and perpendicularly to the surface of the holder plate 36. The construction of the work piece holder is thereby simplified, but on the other hand this holder is not so reliable in use as in case of a displacement of the holder during the operation a readjustment of it into its original position is not always possible, whereas the loose rulers may be easily readjusted. The provision of adjustable rulers on the work piece holder has also the advantage that the rulers may be made more accurate than in case they are made integral with the holder plate, as in Figs. 6-8.

Figure 9:
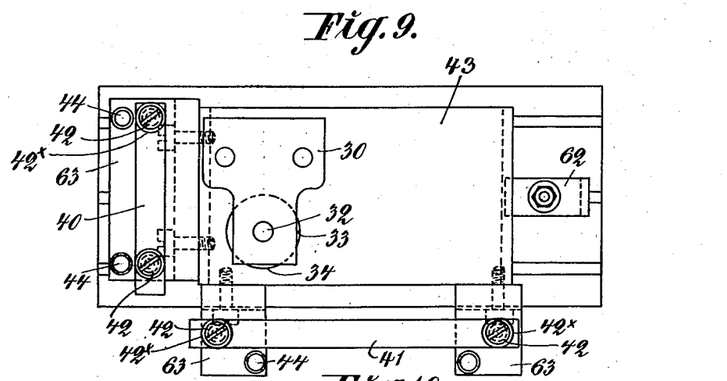
Figs. 9 and 10 are a plan view and a side view respectively of a work piece and a measuring device attached thereto.
Figure 10:
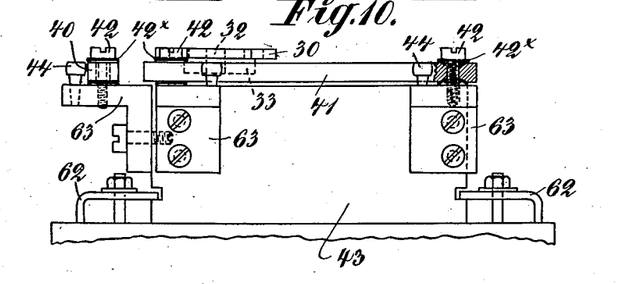

In cases when the work piece has such a thickness or form that the holder plate shown in Figures 3–8 cannot be used conveniently, the arrangement for securing the rulers in fixed relation to the work piece may be modified in the manner shown in Figs. 9 and 10. In this case the work piece 43 is secured directly to the table 16 by means of clamping devices 62 and the rulers 40, 41 are provided on supports 63 in the form of angular pieces screwed to the sides of the work piece. In the example shown there is provided one support at the shorter side and two supports at the longer side of the work piece. The upper surfaces of the supports are in flush with the upper surfaces of the work piece. The rulers may be screwed fast to said supports by means of screws 42, and fixed measuring plugs 44 may be provided on the supports similarly as in Figs. 3, 4 and 5. In case the sides of the work piece are not minutely worked the two supports carrying the ruler 41 might be fastened in such positions mutually as to cause a warping of the ruler. To prevent this there are provided washers 42ˣ having spherical surfaces fitting in spherical recesses in the ruler and by means of which the ruler may be adjusted horizontally independent of the positions of the supports.

Figs. 9 and 10 show another form of a fixed measuring abutment in which the two separate abutments 64, 65 are replaced by a single stud 33 having an outer cylindrical measuring surface 34 concentric with the bore-hole 32. This arrangement is evidently entirely the equivalent of the construction shown in Figs. 1–8 as the measurements can be made in the same way against two different points or surface elements of the stud 33 corresponding to the surfaces 64, 65. The rulers are preferably arranged at a distance from the sides of the work piece equal to half the diameter of the measuring cylinder 33.

Figures 11, 13:
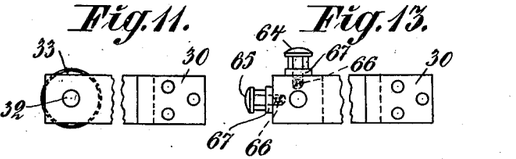
Figs. 11 and 12 are a plan view and a side view respectively of another construction.
Figs. 13 and 14 are similar views of a bracket provided with measuring abutments of another form.
Figures 12, 14:
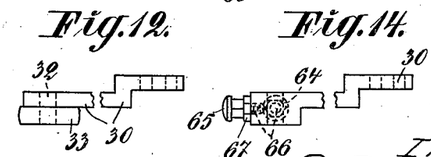

Figs. 11–17 show modified forms of the bracket 30. In these cases the bracket is adapted to be screwed to a horizontal surface 30ˣ of the frame of the machine by means of screws passing through wide holes in the bracket so as to allow of a horizontal adjustment of the bracket. In Figs. 11 and 12 the measuring surface is a surface or rotation concentric with the borehole 32 and having a circular generatrix. Evidently, any other form of a surface of rotation that may be easily worked in a lathe or a grinding machine may be used, but in any case the surface should preferably be co-axial with the borehole 32 or the tool holder spindle respectively.

Figs. 13 and 14 show a similar bracket provided with two separate measuring abutments of the kind shown in Figs. 1–8.

Figure 15:
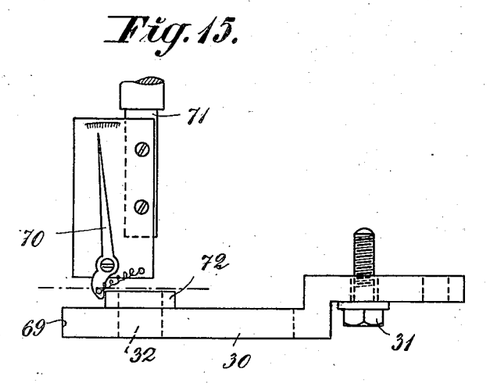
Figs. 15, 16 and 17 are a side view, an end view and a plan view of another form of the bracket, Figs. 15 and 16 showing also a test indicator for accurately positioning the bracket relative to the tool holder spindle.
Figure 16:
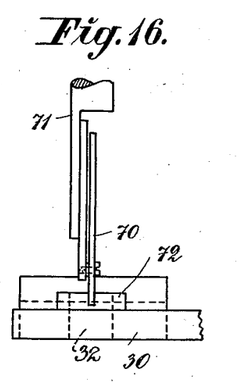
Figure 17:
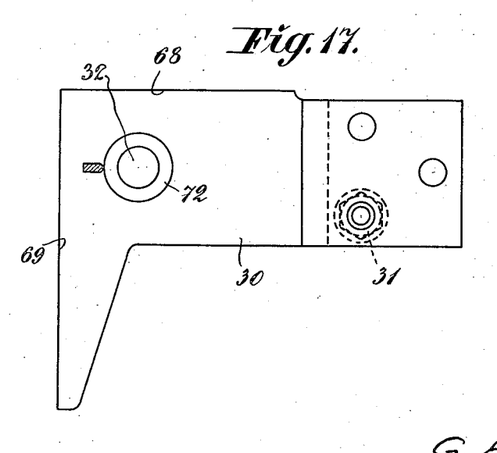

Figs. 15, 16 and 17 show a bracket having two vertical plane measuring surfaces 68, 69 at right angle to each other. The bracket is provided with a hole 32 for the tool to pass through. Said hole is preferably located at equal distances from the said measuring surfaces and co-axial with the axis of the spindle. In order to be able to ascertain the right position of the hole in relation to the spindle, an indicator 70 may be used which is screwed to a rod 71 fastened to the tool holding spindle. The pointer of said indicator is arranged to bear against a stud 72 concentric with a hole 32. In case the indicator maintains its position when turning the spindle round for one revolution this is a proof that the bracket 30 is in its right position in which the axis of the hole 32 will coincide with the axis of the spindle.

In adjusting the bracket 30 the measuring surface 68 should be set parallelly with the directions of movement in which the work table 16 is set by means of the handle 24, Fig. 1. If the movements of the table 16 and the saddle 19 should not be accurately rectilinear it might occur that the measuring surfaces 68 and 69 will not be exactly parallel with the rulers on the table in some positions of the table and the distance between the measuring surfaces 68 or 69 and the corresponding ruler will then be different at different points. If the inaccuracies of the table and the saddle are not too great, this will, however, constitute no practical inconvenience, provided the distances are always measured at a point next to the spindle. The measuring fault will then be exceedingly small and practically of no great importance. The said disadvantage in using two fixed measuring surfaces at right angle to each other is, however, entirely eliminated when using a measuring surface of the kind shown in Figs. 1–14. A bracket of the construction shown in Figs. 15, 16 and 17 may notwithstanding be preferred in some cases with regard to the fact that the resistance of a plane metal surface against impression is considerably larger than in the case of a cylindrical measuring surface. Further, a bracket having two plane measuring surfaces at right angle to each other may be used with advantage as a square for positioning the rulers on the table at right angle to each other.

Figure 18:
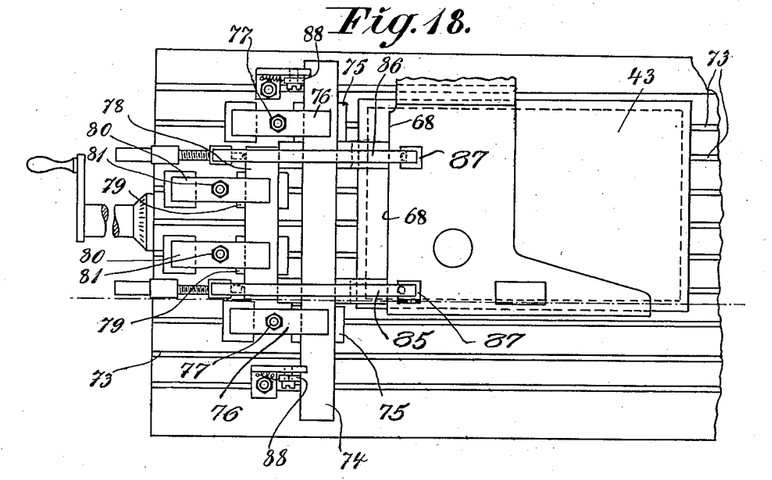
Figs. 18, 19 and 20 are a plan view, a side view and a cross section respectively of a measuring device in connection with a bracket as shown in Figs. 15, 16 and 17.
Figure 19:
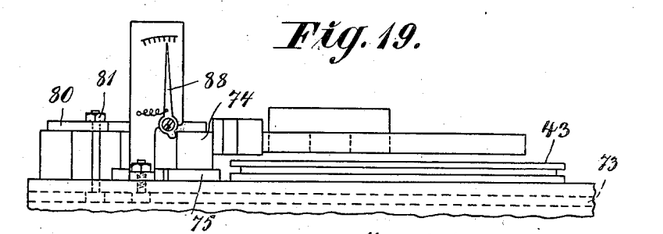
Figure 20:
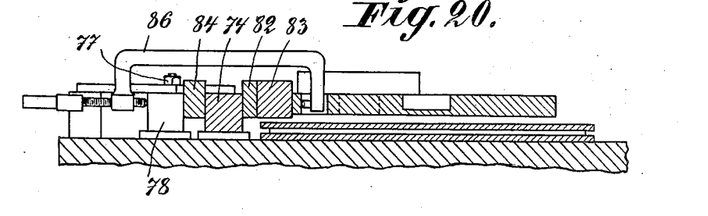

Figs. 18, 19 and 20 show an example of an arrangement for carrying out measuring operations when using a fixed measuring abutment of the form shown in Figs. 15, 16 and 17, only one set of measuring devices being shown for measuring the distances from one side of the work piece. In the example shown the work piece 43 as well as the rulers are clamped directly to the work table 16, which is provided for this purpose with grooves 73 for the clamping bolts. The ruler 74 is placed on plates 75 and clamped fast to the table by means of straps 76 and bolts 77. Behind the ruler 74 is provided a second ruler 78 serving the same purpose as the fixed measuring bolts 44 in Fig. 3. The ruler last mentioned is placed similarly as the ruler 74 on plates 79 and is clamped to the table by means of plates 80 and bolts 81. Before the rulers are clamped fast the work piece 43 as well as the rulers are positioned in relation to the measuring surface 68 in the following way. Two sets of end measures or gage blocks 82, 83 of a suitable total length are placed between the ruler 74 and the measuring surface 68 and two other gage blocks 84 are placed between the two rulers, all the gage blocks and the rulers being then clamped together by means of two cramps 85 and 86 which are inserted with one end in recesses 87 in the bracket 30. The work piece is now placed against the ruler 74 with interposed gage blocks of a length equal to the difference between the distance of the ruler from the axis of the spindle and the distance to be laid off from the side of the work piece. The rulers 74, 78 and the work piece are then clamped in place on the table and the cramps and the gage blocks are removed.

In case the ruler 74 should be displaced unintentionally during the measuring operation, it may be easily re-adjusted against the ruler 78. Such a displacement of the ruler 74 may be indicated by means of a test indicator 88 at each end of the ruler secured to the table and the contact points of which are arranged to bear against the rear edge of the ruler 74.

Figure 21:
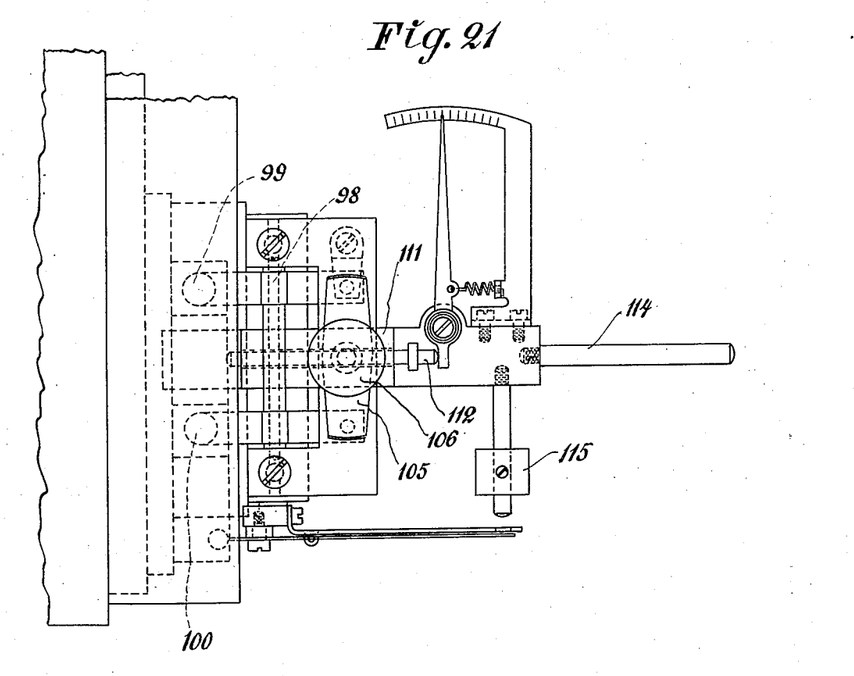
Figs. 21, 22 and 23 are an end view, a plan view and a side view respectively of a device for facilitating the positioning of the work piece in relation to the spindle.
Figure 22:
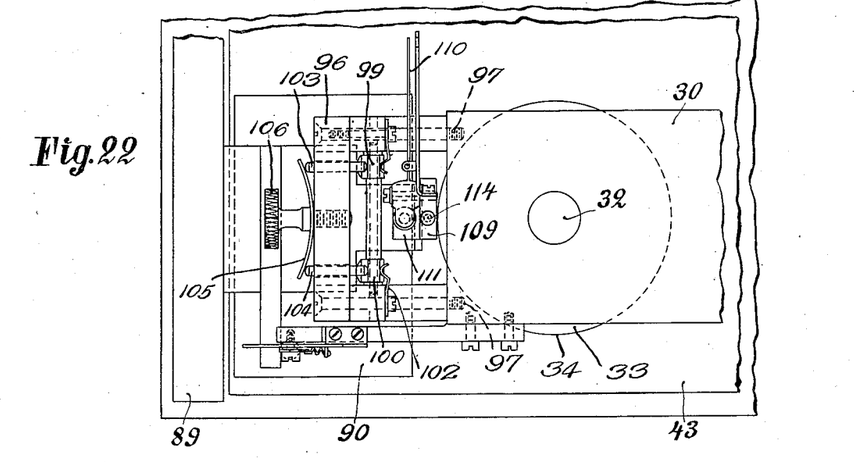
Figure 23:
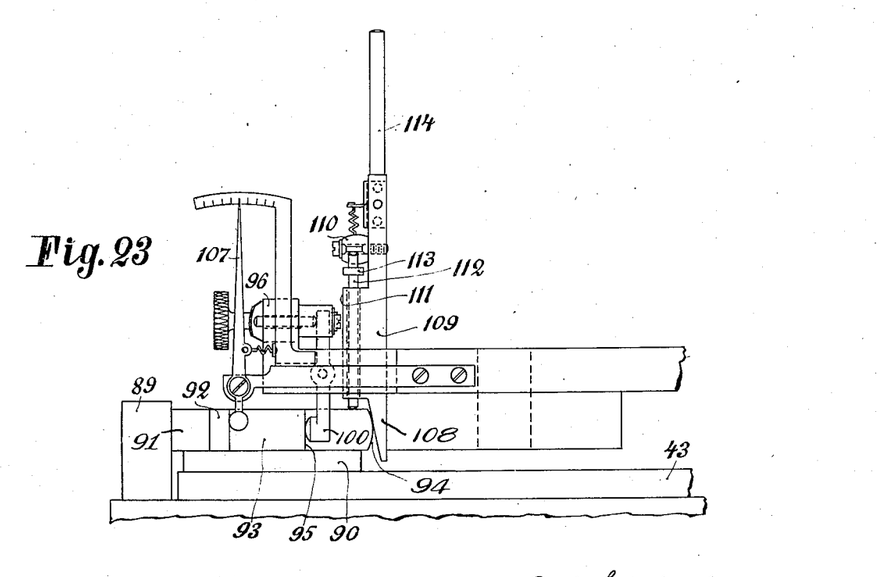

Figs. 21, 22 and 23 illustrate another method of carrying out the measurements by which the measurements may be carried out quickly and with a great accuracy, and which involves the use of a device for obtaining a uniform contact pressure on the gage blocks. The figures show one end of a bracket 30 having a cylindrical stud 33. The work piece 43 as well as the rulers are clamped directly to the table 16. The figures show only one ruler 89 and a corresponding set of measuring devices, another similar set of measuring devices being required for the measurements in relation to the other ruler. Provided on the work piece 43 is a plate 90, on which end measures in the form of gage blocks 91, 92, 93 are placed. The gage block 92 is longer than the others. The gage block 93 adjacent to the measuring cylinder 33 has a cylindrical end surface 94, the axis of which is horizontal and parallel with the other sides of the gage block. Said gage block is provided at each end with an offset shoulder 95. The bracket 30 carries at its fore end a support in the form of a yoke 96 fastened to the bracket by means of screws 97. Journalled in the shanks of said yoke is a pin 98 carrying two levers 99 and 100, which are loose on the pin and which bear with their lower ends against the shoulders 95 on the gage block 93. The upper end of said levers are pressed by springs 101, 102 against one end of pins 103 and 104 respectively slidable in holes in the upward extending middle part of the yoke and bearing against the ends of a plate spring 105 fastened to the middle part of the yoke by means of a thumb screw 106. Mounted on the bracket 30 is a test indicator 107 the contact point of which is arranged to bear against the gage block 92.

Provided between the cylindrical surfaces of the fixed abutment 33 and the gage block 93 is a wedge 108 having an extension in the form of a bar 109 carrying a test indicator 110. The bar 109 has a rib 111 in which a pin 112 is slidably arranged. Said pin is disposed perpendicularly to the theoretical edge of the wedge and parallelly with the wedge plane on the opposite side of the bar 109. It is further provided at its upper end with a collar 113 by means of which the pin will rest on the rib 111 when the wedge is put off. Both ends of the pin are rounded off. One end of the pin bears on the upper surface of the gage block 93 and the upper end is in contact with the contact point of the indicator 110. Screwed into the bar 109 is a rod 114 serving as a handle and as a means for keeping the bar 109 in a vertical position, the upper end of the rod being arranged in engagement with a fork or a similar device fastened to the bracket or the frame. The wedge 108 and the indicator 110 associated therewith constitute a device for measuring or testing the small distance between the fixed measuring abutment and the gage blocks as will be explained below.

The positioning of the table is effected as follows. A set of gage blocks 91, 92 and 93 having a total length equal to the desired distance between the ruler 89 and the measuring cylinder 33, reduced by a suitable measuring unit forming only a fraction of said distance or about $\frac{1}{32}$ inch, is placed on the plate 90. The table is then displaced by means of its traversing screw so that the shoulders 95 are brought into contact with the levers 99 and 100, and, while the spring 105 is now put under tension, the movement of the table is continued, until the distance between the cylindrical surfaces of the gage block 93 and the abutment 33 is equal to the said measuring unit. In order to ascertain that this distance has been attained a gage block of a thickness equal to said measuring unit may be interposed between the cylindrical surfaces. As the testing is then made between two cylindrical surfaces, the axes of which are crossing each other at right angle, the surface adhesion of the gage block to the measuring surfaces will be inconsiderable and the testing will therefore be very accurate. After the table has been thus moved into its right position, the test indicator 107 may be set against the gage block 92. Said indicator may now be used instead of the loose gage block for determining the distance in case of further adjustments of the table, provided the same gage block 93 is used next to the fixed abutment and the contact point of the indicator is caused to bear against the adjacent gage block. It will then only be required to displace the table until the indicator assumes the position previously indicated. In practice the small distance in question should preferably always have the same measure, so that the spring 105 may always cause the gage blocks to be pressed together with the same power, which is of great importance for accurate measurements.

The wedge 108 and indicator 110 associated therewith form another means for determining the distance in question between the cylindrical surfaces. When said wedge is inserted between the two cylindrical surfaces the indicator 110 will show the distance between said surfaces on its dial provided the latter is graduated empirically for this purpose. The wedge with its indicator may, of course, also be used as a zero instrument in measuring the distance. Preferably, it should be used in connection with a gauge consisting of a vertical cylinder and a gage block exactly equal to the spacing block 93 and arranged with its cylindrical surface at a distance from the vertical cylinder which is exactly equal to the distance to be measured. By putting the wedge into said gauge one may ascertain in each particular case the position of the pointer on the dial corresponding to said distance.

Figure 24:
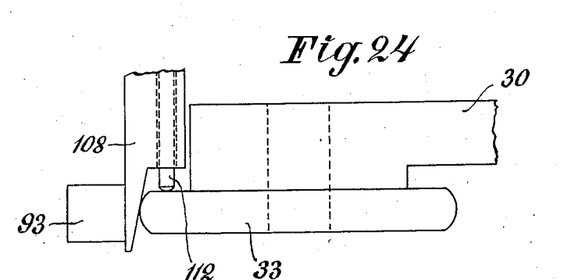
Fig. 24 shows a modified form of a detail of the device last mentioned.

In case the fixed measuring abutment has a measuring surface the generatrix of which is curve-shaped, the end surface of the gage block 94 should be plane, as shown in Fig. 24.

By loosening the thumb screw 106 and removing the spring 105 the gage blocks may be removed without altering the position of the table. The bar 109 is preferably provided with a counter-weight 115 to outbalance the weight of the indicator 110.

It is evident that the measuring method and devices described with reference to the Figures 21–24 may be applied to other machines than milling and boring machines of the type above described and generally they may be used for accurately measuring the distance between two surfaces or edges.

By the expression boring machines it is to be understood that this includes drilling machines.

What I claim is:

1. In drilling, boring and milling machines, the combination of a tool holding spindle rotatable about a fixed axis, a worktable, supporting means having two transverse guideways perpendicular to the axis of the spindle for permitting adjustment of the worktable relative to the spindle in two corresponding directions, two rulers on the table perpendicular to the guideways respectively and two independent abutments outside the spindle having relatively narrow accurate measuring surfaces arranged in determinate relation to the axis of the spindle and located substantially on intersecting planes through the axis of the spindle perpendicular to the rulers respectively.

2. In drilling, boring and milling machines, the combination of a tool holding spindle rotatable about a fixed axis, a worktable, supporting means having two transverse guideways perpendicular to the axis of the spindle for permitting adjustment of the worktable relative to the spindle in two corresponding directions, two rulers on the table perpendicular to the guideways respectively, and two independent abutments outside the spindle adjustable into fixed permanent relationship with the axis of the spindle and having relatively narrow accurate measuring surfaces facing the rulers and located substantially on intersecting planes through the axis of the spindle perpendicular to the rulers respectively.

3. In drilling, boring and milling machines, the combination of a tool holding spindle rotatable about a fixed axis, a worktable, supporting means having two transverse guideways perpendicular to the axis of the spindle for permitting adjustment of the worktable to the spindle in two corresponding directions, two rulers on the table perpendicular to the guideways respectively, a bracket above the table, and two independent abutments on the bracket having relatively narrow accurate measuring surfaces arranged in determinate relation to the axis of the spindle and located substantially on intersecting planes through the axis of the spindle perpendicular to the rulers respectively.

4. A combination as claimed in claim 3, in which the measuring surfaces consist of two surfaces of rotation, the axes of which are arranged substantially in planes passing through the axis of the spindle perpendicular to the rulers.

5. In drilling, boring and milling machines, the combination of a tool holding spindle rotatable about a fixed axis, a support having a guideway, a carriage movably mounted in said guideway and also provided with a guideway transversely arranged relative to the first guideway, a worktable movable in the last guideway, said guideways being arranged perpendicular to the axis of the spindle for permitting adjustment of the worktable relative to the spindle in two corresponding directions, two rulers on the table perpendicular to the guideways respectively, and two independent abutments outside the spindle having relatively narrow accurate measuring surfaces arranged in determinate relation to the axis of the spindle and located substantially on intersecting planes through the axis of the spindle perpendicular to the rulers respectively.

6. In drilling, boring, and milling machines, the combination of a vertical tool holding spindle rotatable about a fixed axis, a worktable, supporting means having two transverse guideways perpendicular to the axis of the spindle for permitting adjustment of the worktable relative to the spindle in two corresponding directions, two rulers on the table perpendicular to the guideways respectively, and two independent abutments in the form of fixed studs having relatively narrow accurate measuring surfaces facing the rulers and arranged in determining relation to the axis of the spindle and located substantially on intersecting planes through the axis of the spindle perpendicular to the rulers.

7. In drilling, boring, and milling machines, the combination of a vertical tool holding spindle rotatable about a fixed axis, a worktable, supporting means having two transverse guideways perpendicular to the axis of the spindle for permitting adjustment of the worktable relative to the spindle in two corresponding directions, two rulers on the table perpendicular to the guideways respectively, and two abutments arranged independently of the movements of the supporting means and the spindle and having accurate measuring surfaces in the form of surfaces of rotation facing the rulers and located substantially on intersecting planes through the axis of the spindle perpendicular to the rulers respectively.

In testimony whereof I affix my signature.

GUSTAF PAUL LAMBERT.